(12) United States Patent
Wu et al.

(10) Patent No.: US 12,742,675 B2
(45) Date of Patent: Sep. 22, 2026

(54) OCCUPANT FEATURE DETECTION METHOD AND SYSTEM, AND COMPUTER READABLE MEDIUM

(71) Applicant: ZF ASIA PACIFIC AUTOMOTIVE SAFETY SYSTEMS (SHANGHAI) CO., LTD., Shanghai (CN)

(72) Inventors: Fengzhan Wu, Shanghai (CN); Zhiwei Huang, Shanghai (CN); Hui Yang, Shanghai (CN); Yuanyi Cheng, Shanghai (CN)

(73) Assignee: ZF ASIA PACIFIC AUTOMOTIVE SAFETY SYSTEMS (SHANGHAI) CO., LTD., Shanghai (CN)

( * ) Notice: Subject to any disclaimer, the term of this patent is extended or adjusted under 35 U.S.C. 154(b) by 832 days.

(21) Appl. No.: 18/015,766

(22) PCT Filed: Jul. 13, 2021

(86) PCT No.: PCT/CN2021/105906

§ 371 (c)(1),
(2) Date: Jan. 12, 2023

(87) PCT Pub. No.: WO2022/012496

PCT Pub. Date: Jan. 20, 2022

(65) Prior Publication Data

US 2023/0280204 A1 Sep. 7, 2023

(30) Foreign Application Priority Data

Jul. 15, 2020 (CN) ......................... 202010680199.2

(51) Int. Cl.
*G01G 19/50* (2006.01)
*B60N 2/00* (2006.01)
*B60N 2/02* (2006.01)

(52) U.S. Cl.
CPC ............. *G01G 19/50* (2013.01); *B60N 2/002* (2013.01); *B60N 2/02* (2013.01)

(58) Field of Classification Search
CPC ........... G01G 19/50; B60N 2/02; B60N 2/002
See application file for complete search history.

(56) References Cited

U.S. PATENT DOCUMENTS 5,184,844 A * 2/1993 Goor ....................... B60R 21/18 280/808
5,678,852 A * 10/1997 Brown .................... B60R 21/21 280/730.2

(Continued)

FOREIGN PATENT DOCUMENTS

CN 107599919 A 1/2018
CN 109941155 A 6/2019

(Continued)

OTHER PUBLICATIONS

PCT International Search Report for corresponding International Application Serial No. PCT/CN2021/105906, mailed Aug. 27, 2021, pp. 1-4.

*Primary Examiner* — John E Breene
(74) *Attorney, Agent, or Firm* — Tarolli, Sundheim, Covell & Tummino LLP

(57) ABSTRACT

An occupant feature detection method and system, and a computer-readable medium, where the method includes: inflating a seat cushion airbag (10) with a gas of a first predetermined volume, and measuring a reference pressure formed by the gas of the first predetermined volume when no occupant is seated; measuring a first pressure formed by the gas of the first predetermined volume after an occupant is seated; and obtaining a first weight based on a difference between the reference pressure and the first pressure, and using the first weight as a reference weight of the occupant. The seat cushion airbag (10) disposed in the vehicle seat is used to calculate the weight of the occupant and determine a sitting position of the occupant based on the difference between the pressure in the seat cushion airbag (10) obtained (Continued)

when no occupant is seated and the pressure in the seat cushion airbag obtained when the occupant is seated. Therefore, a feature of the occupant may be identified without additionally providing a pressure sensor, so that a targeted protection strategy is set for each occupant.

17 Claims, 6 Drawing Sheets

(56) References Cited

U.S. PATENT DOCUMENTS

| | | | | |
|---|---|---|---|---|
| 6,026,340 | A * | 2/2000 | Corrado | B60N 2/0029 701/47 |
| 6,553,296 | B2 * | 4/2003 | Breed | B60N 2/2863 382/140 |
| 6,557,424 | B1 * | 5/2003 | Morell | B60R 21/01516 280/730.1 |
| 8,154,394 | B2 * | 4/2012 | Hansen | B60N 2/0035 340/3.1 |
| 10,112,569 | B2 * | 10/2018 | Hiraiwa | B60R 21/233 |
| 2007/0135982 | A1 | 6/2007 | Breed et al. | |
| 2012/0104812 | A1 * | 5/2012 | Griffin | B60N 2/0025 177/136 |

FOREIGN PATENT DOCUMENTS

| | | | |
|---|---|---|---|
| CN | 212828015 | U | 3/2021 |
| JP | 2007071664 | A | 3/2007 |

* cited by examiner

OCCUPANT FEATURE DETECTION METHOD AND SYSTEM, AND COMPUTER READABLE MEDIUM

RELATED APPLICATIONS

This application is a U.S. National Stage Application filed under 35 USC 371 claiming priority to Serial No. PCT/CN2021/105906, filed on 13 Jul. 2021; which claims priority from Chinese Patent Application CN 202010680199.2, filed 15 Jul. 2020, the entireties of which are hereby incorporated herein by reference.

TECHNICAL FIELD

The present invention relates to a vehicle detection method and system, and a storage medium, and in particular, to an occupant feature detection method and system configured with a seat cushion airbag and a computer-readable medium.

BACKGROUND ART

With the development of the automobile industry, automated driving or autonomous driving has become the mainstream research direction in the future. With the continuous advancement of automated driving, seat positions of an occupant will present more possibilities. Safety during driving has always been the most important. During automated driving or autonomous driving, the occupant's attention may not be on the vehicle control or the road environment, so when there is a safety hazard, it may be difficult for the occupant to react in the first time. Therefore, an occupant protection system is generally provided for automated driving or autonomous driving to ensure the safety of the occupant at critical moments. However, protection measures vary with different sizes and sitting postures of occupants. To provide more targeted protection for an occupant, it is usually necessary to detect a feature such as a weight of the occupant after the occupant is seated, so that an effective protection strategy is set for the occupant in a more targeted manner.

There are already some detection methods for a weight and a sitting posture. For example, a pressure sensor is disposed in a seat to obtain a weight of an occupant, and a sitting posture of the occupant, for example, whether the occupant is sitting in the front or the rear of the seat, is obtained based on a pressure distribution. However, this method of using the pressure sensor is expensive, and may affect the comfort of the seat. In addition, due to different sizes and postures of occupants, measurement results of the pressure sensor are not always accurate.

SUMMARY OF THE INVENTION

To resolve the defects in the art that feature parameters of an occupant are obtained by using a pressure sensor, which increases the cost of a seat and causes an error in a detection result, the present invention provides an occupant feature detection method and system that utilize a seat cushion airbag in a seat to detect a feature of an occupant with higher accuracy and no extra cost and a computer-readable medium.

The object of the present invention is realized by the following technical solutions:

An occupant feature detection method, including:

S101: inflating a seat cushion airbag with a gas of a first predetermined volume, and measuring a reference pressure formed by the gas of the first predetermined volume when no occupant is seated;

S102: measuring a first pressure formed by the gas of the first predetermined volume when it is detected that an occupant is seated;

S103: obtaining a first weight based on a difference between the reference pressure and the first pressure, and using the first weight as a reference weight of the occupant.

The present invention further provides an occupant feature detection method, including:

S101: inflating a seat cushion airbag with a gas of a first predetermined volume, and measuring a reference pressure formed by the gas of the first predetermined volume when no occupant is seated;

S102: measuring a first pressure formed by the gas of the first predetermined volume after an occupant is seated; and obtaining a size of the occupant and obtaining a second weight based on the size;

S103: obtaining a first weight based on a difference between the reference pressure and the first pressure; and

S104: calculating a weighted weight based on a first weighting value allocated to the first weight and a second weighting value allocated to the second weight, and using the weighted weight as a reference weight of the occupant.

Preferably, the size of the occupant is obtained by obtaining joint point information and/or contour information and/or depth information of the occupant by using a camera and/or a radar in step S102.

Preferably, before, when, or after step S101 is performed, the method includes:

S111: inflating the seat cushion airbag with a gas of a second predetermined volume, and measuring reference pressures formed by the gas of the second predetermined volume at various positions of the seat cushion airbag when no occupant is seated;

S112: measuring second pressures formed by the gas of the second predetermined volume at the various positions of the seat cushion airbag when it is detected that an occupant is seated; and

S113: inferring a first sitting position based on a difference between the reference pressure and the second pressure that are at each position of the seat cushion airbag, and using the first sitting position as a reference sitting position of the occupant.

In another preferred embodiment of the present invention, step S112 further includes: obtaining a second sitting position of the occupant in the vehicle by using an occupant observation module when it is detected that an occupant is seated; and after step S113, the method further includes:

S114: calculating a weighted position based on a third weighting value allocated to the first sitting position and a fourth weighting value allocated to the second sitting position, and using the weighted position as the reference sitting position of the occupant.

The first predetermined volume may be the same as or different from the second predetermined volume.

Preferably, step S111 includes:

S1111: dividing the seat cushion airbag into a plurality of inflation areas;

S1112: inflating each inflation area with an initial gas;

S1113: measuring a reference pressure formed by the initial gas in each inflation area when no occupant is seated, and measuring an actual pressure formed by the initial gas in each inflation area when it is detected that an occupant is seated; and

S1114: obtaining a position distribution based on a difference between the reference pressure in each inflation area and the actual pressure in the inflation area, and defining the first sitting position of the occupant based on the position distribution.

Preferably, volumes of initial gases in at least some inflation areas are the same.

Preferably, step S112 includes: obtaining the second sitting position by obtaining depth information of the occupant by using a time-of-flight (ToF) camera (the ToF technology refers to that a group of infrared light (laser pulse) that is invisible to the human eyes is emitted outward, reflected after encountering an object, and ends when being reflected to the camera, a difference between the time at which the light is emitted and the time at which the light is reflected to the camera or a phase difference are calculated, and data is collected to form a set of distance depth data, so as to obtain an imaging technology of a stereoscopic 3D model).

The present invention further provides an occupant feature detection system, including a seat cushion airbag, where the occupant feature detection system further includes an inflation module configured to inflate a seat cushion airbag, a control module, a detection module, and a calculation module, where the control module is configured to control the inflation module to inflate the seat cushion airbag with a gas of a first predetermined volume;

the detection module is configured to measure a reference pressure formed by the gas of the first predetermined volume when no occupant is seated, and measure a first pressure formed by the gas of the first predetermined volume when it is detected that an occupant is seated; and the calculation module is configured to obtain a first weight based on a difference between the reference pressure and the first pressure, and use the first weight as a reference weight of the occupant.

Preferably, the control module is configured to control the inflation module to inflate the seat cushion airbag with a gas of a second predetermined volume;

the detection module is configured to: measure reference pressures formed by the gas of the second predetermined volume at various positions of the seat cushion airbag when no occupant is seated, and measure second pressures formed by the gas of the second predetermined volume at the various positions of the seat cushion airbag when it is detected that an occupant is seated; and the calculation module is configured to infer a first sitting position based on a difference between the reference pressure and the second pressure that are at each position of the seat cushion airbag, and use the first sitting position as a reference sitting position of the occupant.

Preferably, the occupant feature detection system further includes an occupant observation module configured to obtain a size of the occupant and obtain a second weight based on the size; and the calculation module is configured to calculate a weighted weight based on a first weighting value allocated to the first weight and a second weighting value allocated to the second weight, and use the weighted weight as the reference weight of the occupant.

Preferably, the occupant observation module includes a camera and/or a radar disposed in a vehicle that are configured to obtain the size of the occupant by obtaining joint point information and/or contour information and/or depth information of the occupant.

Preferably, the occupant observation module is further configured to obtain a second sitting position of the occupant in the vehicle; and the calculation module is further configured to: infer a first sitting position based on a difference between the reference pressure and the second pressure that are at each position of the seat cushion airbag, calculate a weighted position based on a third weighting value allocated to the first sitting position and a fourth weighting value allocated to the second sitting position, and use the weighted position as the reference sitting position of the occupant.

The first predetermined volume may be the same as or different from the second predetermined volume.

Preferably, the occupant observation module includes a ToF camera configured to obtain the second sitting position by obtaining depth information of the occupant.

Preferably, the seat cushion airbag includes a plurality of gas bags;

the inflation module is configured to inflate each gas bag with an initial gas;

the detection module is configured to measure a reference pressure formed by the initial gas in each gas bag when no occupant is seated, and measure an actual pressure formed by the initial gas in the gas bag when it is detected that an occupant is seated; and the calculation module is configured to obtain a position distribution based on a difference between the reference pressure in each gas bag and the actual pressure in the gas bag, and define the first sitting position of the occupant based on the position distribution. A weighted calculation is performed based on the first sitting position obtained using this method and the second sitting position obtained by using the occupant observation module, to obtain the reference sitting position that is more accurate.

Preferably, volumes of initial gases in at least some gas bags are the same.

The present invention further provides a computer-readable medium, where the computer-readable medium stores computer instructions that, when executed by a processor, implement the steps of the occupant feature detection method of any one of the above.

The technical effects obtained by the present invention are as follows:

There is no need to additionally provide a pressure sensor in the seat. According to the present invention, the seat cushion airbag disposed in the seat is utilized to detect both the weight and the size, so as to fully consider the actual situation of the occupant and make a targeted safety strategy for the occupant, thereby further ensuring the safety of the occupant.

DETAILED DESCRIPTION OF EMBODIMENTS

The specific implementations of the present invention will be further described below with reference to the accompanying drawings.

Figure 1:
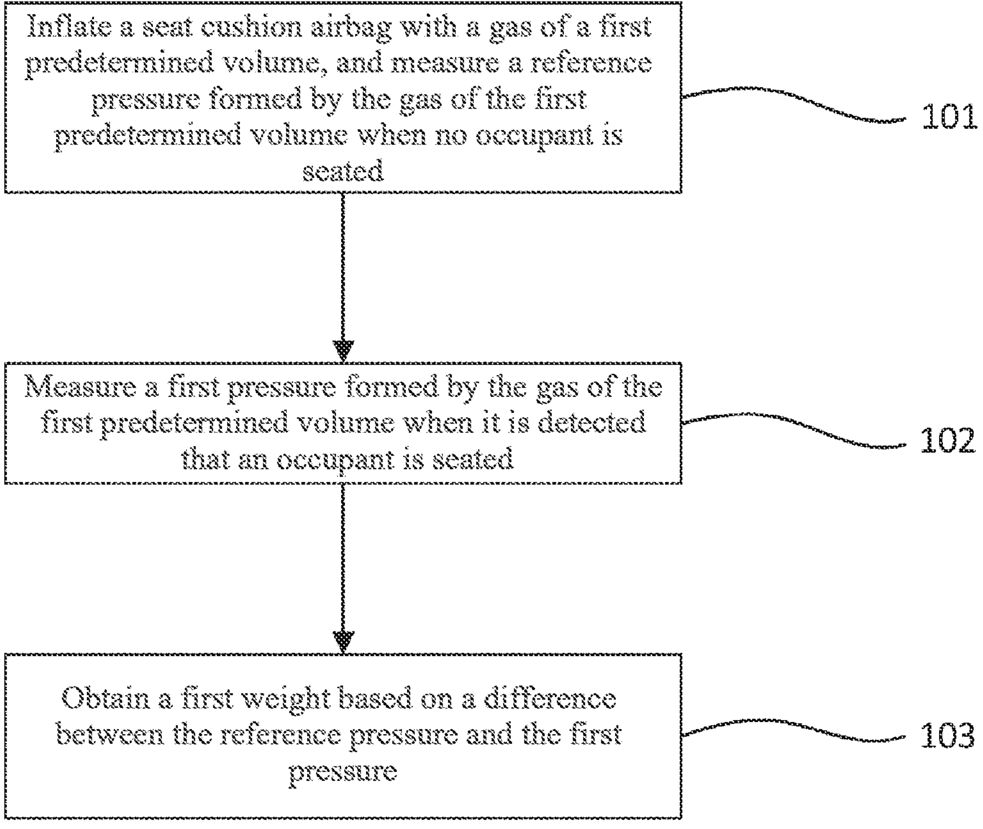
FIG. 1 is a flowchart of detection of a reference weight of an occupant in an occupant feature detection method according to an embodiment of the present invention.
Figure 2:
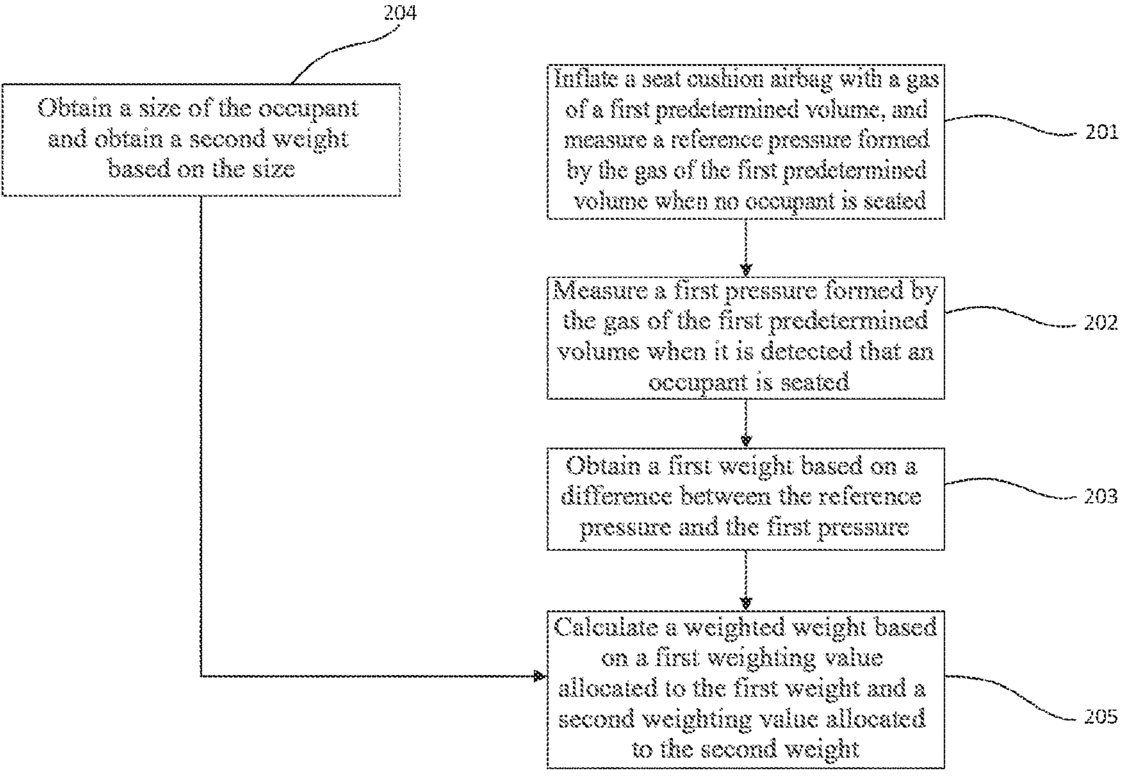
FIG. 2 is a flowchart of detection of a reference weight of an occupant in an occupant feature detection method according to another embodiment of the present invention.

Referring to FIG. 1 and FIG. 2, an occupant feature detection method according to two preferred embodiments of the present invention is described, where obtaining a reference weight of an occupant includes the following steps:

referring to FIG. 1, step 101: inflating a seat cushion airbag with a gas of a first predetermined volume, and measuring a reference pressure formed by the gas of the first predetermined volume when no occupant is seated;

step 102: measuring a first pressure formed by the gas of the first predetermined volume after an occupant is seated; and step 103: obtaining a first weight based on a difference between the reference pressure and the first pressure, and using the first weight as a reference weight of the occupant.

Referring to FIG. 2, in another embodiment, to obtain the reference weight of the occupant more accurately, the method further includes the following steps (steps 201 to 203 are respectively the same as steps 101 to 103 in FIG. 1).

In step 204, a size of the occupant is obtained and a second weight is obtained based on the size, for example, the size of the occupant is obtained by obtaining joint point information and/or contour information of the occupant by using a camera and/or a radar disposed in a vehicle, for example, a sitting height may be obtained by obtaining a distance between a pelvic joint point and the top of the head of the occupant, to generally determine the size of the occupant. Alternatively, depth information of the person may be obtained by using a ToF camera, so that a distance between the person and the ToF camera may be measured, and the size of the occupant may be obtained based on the distance and the joint point information.

In step 205, a weighted weight is calculated based on a first weighting value allocated to the first weight and a second weighting value allocated to the second weight, and the weighted weight is used as the reference weight of the occupant.

Figure 3:
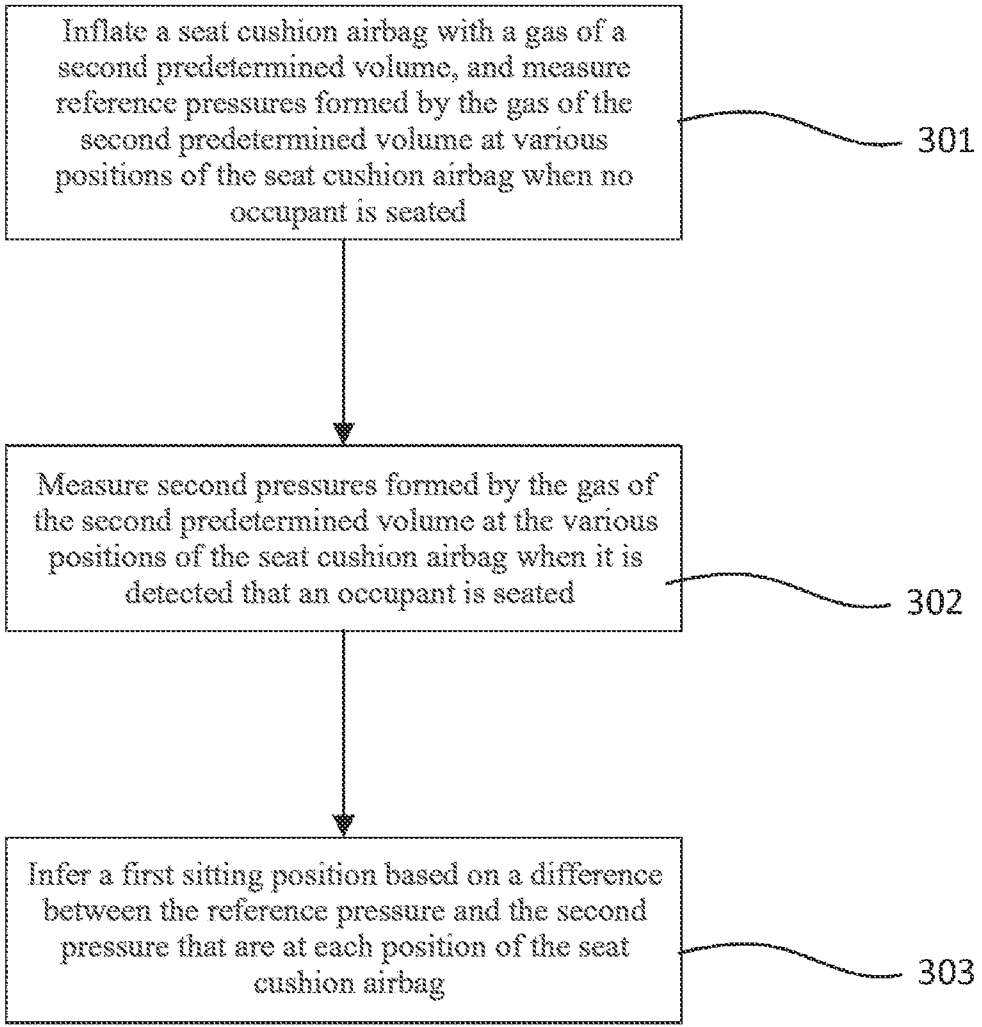
FIG. 3 is a flowchart of detection of a reference sitting position of an occupant in an occupant feature detection method according to still another embodiment of the present invention.
Figure 4:
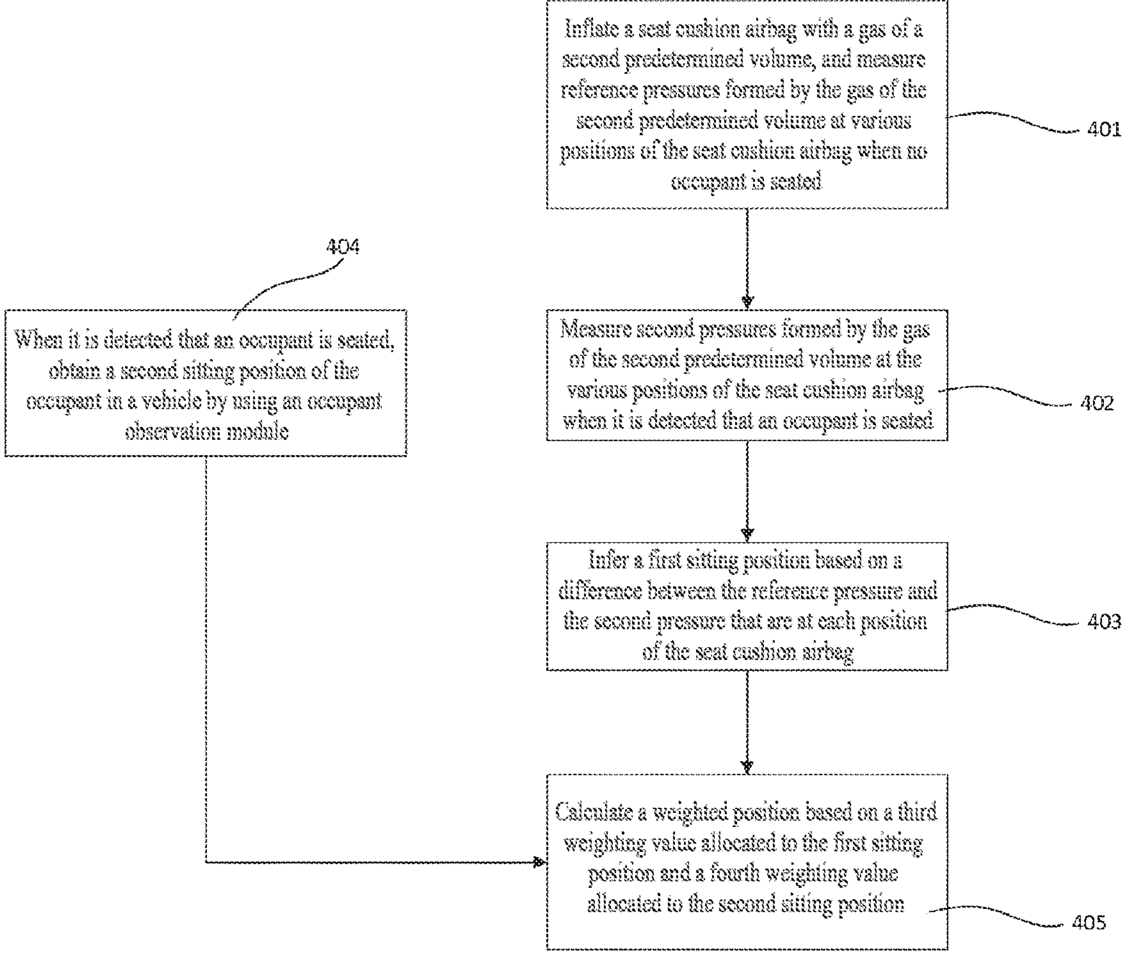
FIG. 4 is a flowchart of detection of a reference sitting position of an occupant in an occupant feature detection method according to yet another embodiment of the present invention.

Referring to FIG. 3 and FIG. 4 below, detection of a reference sitting position in occupant feature detection methods according to two preferred embodiments of the present invention is described. Referring to FIG. 3, a method of detecting a sitting position of an occupant includes the following steps.

In step 301, a seat cushion airbag is inflated with a gas of a second predetermined volume, and reference pressures formed by the gas of the second predetermined volume at various positions of the seat cushion airbag when no occupant is seated are measured, for example, a plurality of airbags are placed at different positions in a seat cushion, and therefore, pressures at the positions obtained when a person is seated on the seat cushion are different. The reference pressure is measured first at the initial moment. Then, a position of the person is determined based on different pressure distributions. For example, a position with a relatively high pressure is the position toward which the person slides. Those skilled in the art can understand that the first predetermined volume and the second predetermined volume may be the same or different without affecting the implementation of the present invention.

In step 302, second pressures formed by the gas of the second predetermined volume at the various positions of the seat cushion airbag when an occupant is seated are measured.

In step 303, a first sitting position is inferred based on a difference between the reference pressure and the second pressure that are at each position of the seat cushion airbag, and the first sitting position is used as a reference sitting position of the occupant.

In another embodiment, referring to FIG. 4 (steps 401 to 403 are respectively the same as steps 301 to 303 in FIG. 3), in step 404, when it is detected that an occupant is seated, a second sitting position of the occupant in a vehicle is obtained by using an occupant observation module, for example, depth information of the occupant is obtained by using a ToF camera, to obtain the second sitting position.

In step 405, a weighted position is calculated based on a third weighting value allocated to the first sitting position and a fourth weighting value allocated to the second sitting position, and the weighted position is used as a reference sitting position of the occupant.

In the technical solution, the seat cushion airbag is utilized to accurately obtain the reference weight and reference sitting position of the occupant, so as to set an inflation condition for each occupant in a targeted manner, thereby providing targeted protection for the occupant.

Those skilled in the art can understand that, in the occupant feature detection method of the present invention, the reference weight and the reference sitting position may be obtained in any order, that is, may be obtained sequentially or simultaneously.

Figure 5:
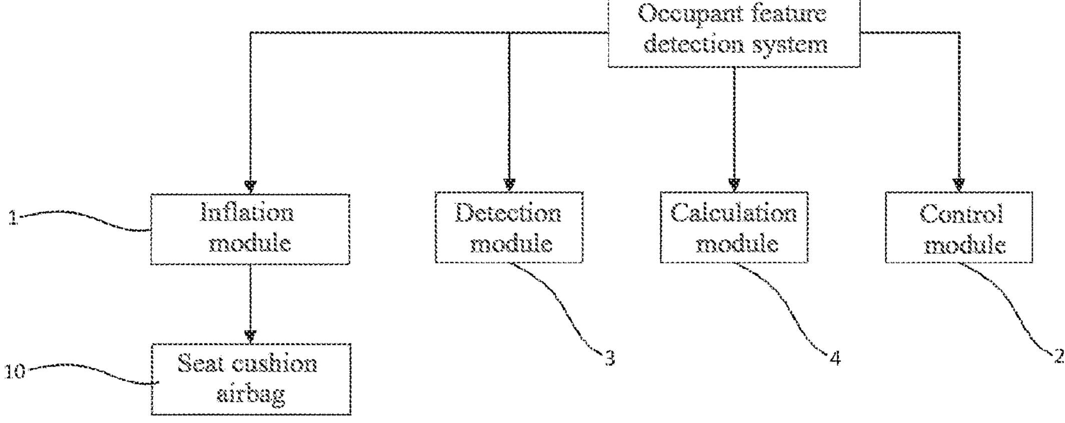
FIG. 5 is a structural block diagram of an occupant feature detection system according to an embodiment of the present invention.
Figure 6:
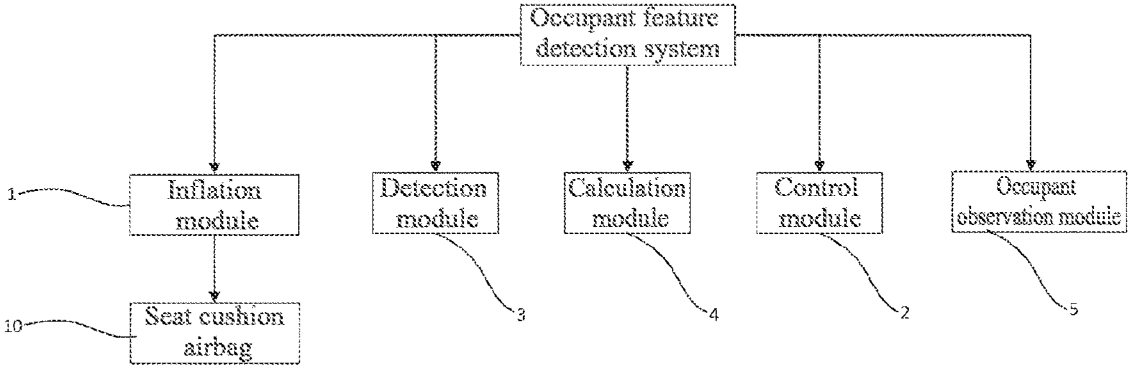
FIG. 6 is a structural block diagram of an occupant feature detection system according to another embodiment of the present invention.

Referring to FIG. 5 and FIG. 6 below, an occupant feature detection system according to two preferred embodiments of the present invention is described. Referring to FIG. 5 first, the occupant feature detection system includes a seat cushion airbag 10, and the occupant feature detection system further includes an inflation module 1 configured to inflate the seat cushion airbag, a control module 2, a detection module 3, and a calculation module 4.

The control module 2 is configured to control the inflation module to inflate the seat cushion airbag 10 with a gas of a first predetermined volume.

The detection module 3 is configured to measure a reference pressure formed by the gas of the first predetermined volume when no occupant is seated, and measure a first pressure formed by the gas of the first predetermined volume when it is detected that an occupant is seated.

The calculation module 4 is configured to obtain a first weight based on a difference between the reference pressure and the first pressure, and use the first weight as a reference weight of the occupant.

In addition, the control module 2 is configured to control the inflation module 1 to inflate the seat cushion airbag 10 with a gas of a second predetermined volume.

The detection module 3 is configured to measure reference pressures formed by the gas of the second predetermined volume at various positions of the seat cushion airbag when no occupant is seated, and measure second pressures formed by the gas of the second predetermined volume at the various positions of the seat cushion airbag when it is detected that an occupant is seated.

The calculation module 4 is configured to infer a first sitting position based on a difference between the reference pressure and the second pressure that are at each position of the seat cushion airbag, and use the first sitting position as a reference sitting position of the occupant. The first predetermined volume may be the same as or different from the second predetermined volume.

Referring to FIG. 6, to obtain the reference weight of the occupant more accurately, the occupant feature detection system further includes an occupant observation module 5. The occupant observation module 5 may be configured to obtain a size of the occupant and obtain a second weight based on the size. The calculation module 4 is further configured to calculate a weighted weight based on a first weighting value allocated to the first weight and a second weighting value allocated to the second weight. In addition, the occupant observation module 5 may be further configured to obtain a second sitting position of the occupant in a vehicle. The calculation module 4 may be further configured to calculate a weighted position based on a third weighting value allocated to the first sitting position and a fourth weighting value allocated to the second sitting position, and use the weighted position as the reference sitting position of the occupant.

The inflation module 1 may be configured to inflate the seat cushion airbag in a plurality of manners. A preferred implementation is as follows: the seat cushion airbag includes a plurality of gas bags, the inflation module 1 is configured to inflate each gas bag with an initial gas, and therefore, the detection module 3 is configured to measure a reference pressure formed by the initial gas in each gas bag when no occupant is seated, and measure an actual pressure formed by the initial gas in the gas bag when it is detected that an occupant is seated. Volumes of initial gases in at least some gas bags are the same.

The present invention further provides a computer-readable medium, where the computer-readable medium stores computer instructions that, when executed by a processor, implement the steps of the occupant feature detection method of any one of the above.

According to the present invention, the inflatable seat cushion airbag is used to obtain the reference weight and reference sitting position of the occupant based on different pressures and pressure distributions of the gas in the seat cushion airbag obtained when no occupant is seated and when the occupant is seated. Therefore, a feature of the occupant can be obtained without additionally providing a pressure sensor, so that a targeted protection strategy is set for each occupant, thereby improving the driving safety.

Although the specific embodiments of the present invention are described above, it should be appreciated by those skilled in the art that these are merely illustrative and that the scope of protection of the present invention is defined by the appended claims. Various changes or modifications to these embodiments may be made by those skilled in the art without departing from the principle and spirit of the present invention, and these changes or modifications fall within the scope of the present invention.

What is claimed is:

1. An occupant feature detection method, comprising:

S101: inflating a seat cushion airbag with a gas of a first predetermined volume, and measuring a reference pressure formed by the gas of the first predetermined volume when no occupant is seated;

S102: measuring a first pressure formed by the gas of the first predetermined volume after an occupant is seated; and obtaining a size of the occupant and obtaining a second weight based on the size;

S103: obtaining a first weight based on a difference between the reference pressure and the first pressure; and

S104: calculating a weighted weight based on a first weighting value allocated to the first weight and a second weighting value allocated to the second weight, and using the weighted weight as the reference weight of the occupant.

2. The occupant feature detection method of claim 1, wherein the size of the occupant is obtained by obtaining joint point information and/or contour information and/or depth information of the occupant by using a camera and/or a radar in step S102.

3. The occupant feature detection method of claim 1, wherein before, when, or after step S101 is performed, the method comprises:

S111: inflating the seat cushion airbag with a gas of a second predetermined volume, and measuring reference pressures formed by the gas of the second predetermined volume at various positions of the seat cushion airbag when no occupant is seated;

S112: measuring second pressures formed by the gas of the second predetermined volume at the various positions of the seat cushion airbag when an occupant is seated; and

S113: inferring a first sitting position based on a difference between the reference pressure and the second pressure that are at each position of the seat cushion airbag, and using the first sitting position as a reference sitting position of the occupant.

4. An occupant feature detection method, comprising:

S101: inflating a seat cushion airbag with a gas of a first predetermined volume, and measuring a reference pressure formed by the gas of the first predetermined volume when no occupant is seated;

S102: measuring a first pressure formed by the gas of the first predetermined volume after an occupant is seated; and

S103: obtaining a first weight based on a difference between the reference pressure and the first pressure, and using the first weight as a reference weight of the occupant, wherein before, when, or after step S101 is performed, the method comprises:

S111: inflating the seat cushion airbag with a gas of a second predetermined volume, and measuring reference pressures formed by the gas of the second predetermined volume at various positions of the seat cushion airbag when no occupant is seated;

S112: measuring second pressures formed by the gas of the second predetermined volume at the various positions of the seat cushion airbag when an occupant is seated; and obtaining a second sitting position of the occupant in a vehicle by using an occupant observation module;

S113: inferring a first sitting position based on a difference between the reference pressure and the second pressure that are at each position of the seat cushion airbag; and S114: calculating a weighted position based on a third weighting value allocated to the first sitting position and a fourth weighting value allocated to the second sitting position, and using the weighted position as a reference sitting position of the occupant.

5. The occupant feature detection method of claim 4, wherein step S112 comprises: obtaining the second sitting position by obtaining depth information of the occupant by using a ToF camera.

6. The occupant feature detection method of claim 4, wherein step S111 comprises:

S1111: dividing the seat cushion airbag into a plurality of inflation areas;

S1112: inflating each inflation area with an initial gas;

S1113: measuring a reference pressure formed by the initial gas in each inflation area when no occupant is seated, and measuring an actual pressure formed by the initial gas in each inflation area when it is detected that an occupant is seated; and S1114: obtaining a position distribution based on a difference between the reference pressure in each inflation area and the actual pressure in the inflation area, and defining the first sitting position of the occupant based on the position distribution.

7. The occupant feature detection method of claim 6, wherein volumes of initial gases in at least some inflation areas are the same.

8. An occupant feature detection system, comprising a seat cushion airbag, wherein the occupant feature detection system further comprises an inflation module configured to inflate the seat cushion airbag, a control module, a detection module, and a calculation module, wherein the control module is configured to control the inflation module to inflate the seat cushion airbag with a gas of a first predetermined volume;

the detection module is configured to measure a reference pressure formed by the gas of the first predetermined volume when no occupant is seated, and measure a first pressure formed by the gas of the first predetermined volume when it is detected that an occupant is seated; and the calculation module is configured to obtain a first weight based on a difference between the reference pressure and the first pressure, and use the first weight as a reference weight of the occupant;

wherein the occupant feature detection system further comprises an occupant observation module configured to obtain a size of the occupant and obtain a second weight based on the size; and the calculation module is configured to calculate a weighted weight based on a first weighting value allocated to the first weight and a second weighting value allocated to the second weight, and use the weighted weight as the reference weight of the occupant.

9. The occupant feature detection system of claim 8, wherein the control module is configured to control the inflation module to inflate the seat cushion airbag with a gas of a second predetermined volume;

the detection module is configured to measure reference pressures formed by the gas of the second predetermined volume at various positions of the seat cushion airbag when no occupant is seated, and measure second pressures formed by the gas of the second predetermined volume at the various positions of the seat cushion airbag when it is detected that an occupant is seated; and the calculation module is configured to infer a first sitting position based on a difference between the reference pressure and the second pressure that are at each position of the seat cushion airbag, and use the first sitting position as a reference sitting position of the occupant.

10. The occupant feature detection system of claim 8, wherein the occupant observation module comprises a camera and/or a radar disposed in a vehicle that are configured to obtain the size of the occupant by obtaining joint point information and/or contour information and/or depth information of the occupant.

11. The occupant feature detection system of claim 9, wherein the occupant observation module is further configured to obtain a second sitting position of the occupant in a vehicle; and the calculation module is further configured to calculate a weighted position based on a third weighting value allocated to the first sitting position and a fourth weighting value allocated to the second sitting position, and use the weighted position as the reference sitting position of the occupant.

12. The occupant feature detection system of claim 11, wherein the occupant observation module comprises a ToF camera configured to obtain the second sitting position by obtaining depth information of the occupant.

13. The occupant feature detection system of claim 11, wherein the seat cushion airbag comprises a plurality of gas bags;

the inflation module is configured to inflate each gas bag with an initial gas;

the detection module is configured to measure a reference pressure formed by the initial gas in each gas bag when no occupant is seated, and measure an actual pressure formed by the initial gas in the gas bag when it is detected that an occupant is seated; and the calculation module is configured to obtain a position distribution based on a difference between the reference pressure in each gas bag and the actual pressure in the gas bag, and define the first sitting position of the occupant based on the position distribution.

14. The occupant feature detection system of claim 13, wherein volumes of initial gases in at least some gas bags are the same.

15. A non-transitory computer-readable medium, wherein the non-transitory computer-readable medium stores computer instructions that, when executed by a processor, implement the steps of the occupant feature detection method of claim 1.

16. A non-transitory computer-readable medium, wherein the non-transitory computer-readable medium stores computer instructions that, when executed by a processor, implement the steps of the occupant feature detection method of claim 4.

17. A non-transitory computer-readable medium, wherein the non-transitory computer-readable medium stores computer instructions that, when executed by a processor, implement the occupant feature detection system of claim 2.

* * * * *